(12) United States Patent
Tanaka

(10) Patent No.: US 7,753,554 B2
(45) Date of Patent: Jul. 13, 2010

(54) LIGHT SOURCE APPARATUS

(75) Inventor: Hiroshi Tanaka, Tokyo (JP)

(73) Assignee: Olympus Corporation, Tokyo (JP)

( * ) Notice: Subject to any disclaimer, the term of this patent is extended or adjusted under 35 U.S.C. 154(b) by 321 days.

(21) Appl. No.: 11/914,580

(22) PCT Filed: May 24, 2006

(86) PCT No.: PCT/JP2006/310370

§ 371 (c)(1),
(2), (4) Date: Nov. 16, 2007

(87) PCT Pub. No.: WO2006/126597

PCT Pub. Date: Nov. 30, 2006

(65) Prior Publication Data

US 2009/0059557 A1     Mar. 5, 2009

(30) Foreign Application Priority Data

May 24, 2005 (JP) .............................. 2005-151145

(51) Int. Cl.
*F21V 33/00* (2006.01)

(52) U.S. Cl. .................. 362/249.02; 362/282; 362/322; 362/323; 362/297

(58) Field of Classification Search .......... 362/322.323, 362/282, 249.02, 287, 285
See application file for complete search history.

(56) References Cited

U.S. PATENT DOCUMENTS

| | | | |
|---|---|---|---|
| 6,962,429 B2 | 11/2005 | Yamamoto | |
| 6,991,336 B2 | 1/2006 | Matsui | |
| 7,080,909 B2 | 7/2006 | Matsui | |
| 7,128,423 B2 | 10/2006 | Imade et al. | |
| 7,213,929 B2 | 5/2007 | Imade | |
| 7,234,823 B2 * | 6/2007 | Imade | ........................ 353/102 |
| 7,452,087 B2 * | 11/2008 | Imade | ........................ 353/102 |
| 2004/0125601 A1 * | 7/2004 | Coates et al. | ............... 362/284 |

FOREIGN PATENT DOCUMENTS

EP        1 395 064 A2     3/2004

(Continued)

OTHER PUBLICATIONS

Supplementary European Search Report dated Oct. 1, 2009 from corresponding European Patent Application No. 06746801.7.

*Primary Examiner*—Laura Tso
(74) *Attorney, Agent, or Firm*—Volpe and Koenig P.C.

(57) ABSTRACT

A light source apparatus includes a plurality of light sources arranged around a circumference; an optical unit for receiving illumination light emitted from one of the light sources disposed at a corresponding position by relatively rotating around a center axis about which the light sources are arranged; a motor for relatively rotating the light source unit and/or the plurality of light sources; a mode-setting unit for setting a first mode and a second mode; a motor controlling unit for controlling the rotational speed of the motor according to the first mode and the second mode; and a light-source controlling unit for controlling the illumination state of the light sources according to the first mode and the second mode, wherein, when the light sources are to be illuminated, the first mode is set, and when the light sources are to be extinguished, the second mode is set.

10 Claims, 11 Drawing Sheets

FOREIGN PATENT DOCUMENTS

| | | |
|---|---|---|
| JP | 2002-182304 | 6/2002 |
| JP | 2003-346503 | 12/2003 |
| JP | 2004-071393 | 3/2004 |
| JP | 2004-199024 | 7/2004 |
| JP | 2004-055563 | 11/2007 |

* cited by examiner

FIG. 3

| No. | DETECTION INFORMATION (INPUT) | LAST-SET MODE (MODE-CHANGE CONDITION) | OPERATING MODE (OUTPUT) | ROTATIONAL SPEED OF MOTORb (OUTPUT) |
|---|---|---|---|---|
| 1 | POWER ON | — | NORMAL MODE | 3600rpm |
| 2 | INSTRUCTION FOR CHANGING TO SLEEP MODE | NORMAL MODE | SLEEP MODE | 1200rpm |
| 3 | INSTRUCTION FOR CHANGING TO NORMAL MODE | SLEEP MODE | NORMAL MODE | 3600rpm |
| 4 | TERMINATION OF IMAGE INPUT SIGNAL | NORMAL MODE WITH INPUT SIGNAL | SLEEP MODE | 1200rpm |
| 5 | DETECTION OF IMAGE INPUT SIGNAL | SLEEP MODE WITHOUT INPUT SIGNAL | NORMAL MODE | 3600rpm |
| 6 | IME-UP | SLEEP MODE WITHOUT INPUT SIGNAL | SLEEP MODE | 0rpm |

FIG. 4

| No. | DETECTION INFORMATION (INPUT) | LAST-SET MODE (MODE-CHANGE CONDITION) | OPERATING MODE (OUTPUT) | ROTATIONAL SPEED OF MOTOR (OUTPUT) |
|---|---|---|---|---|
| 1 | POWER ON | – | NORMAL MODE | 3600rpm |
| 2 | INSTRUCTION FOR CHANGING TO SLEEP MODE | NORMAL MODE | SLEEP MODE | 1200rpm |
| 3 | INSTRUCTION FOR CHANGING TO NORMAL MODE | SLEEP MODE | NORMAL MODE | 3600rpm |
| 4 | TIME-UP | SLEEP MODE | SLEEP MODE | 0rpm |

FIG. 5

| No. | DETECTION INFORMATION (INPUT) | LAST-SET MODE (MODE-CHANGE CONDITION) | OPERATING MODE (OUTPUT) | ROTATIONAL SPEED OF MOTOR (OUTPUT) |
|---|---|---|---|---|
| 1 | POWER ON | — | NORMAL MODE | 3600rpm |
| 2 | INSTRUCTION FOR CHANGING TO SLEEP MODE | NORMAL MODE | SLEEP MODE | 3600rpm |
| 3 | INSTRUCTION FOR CHANGING TO NORMAL MODE | SLEEP MODE | NORMAL MODE | 3600rpm |
| 4 | TIME-UP | SLEEP MODE | SLEEP MODE | 0rpm |

FIG. 6

| No. | DETECTION INFORMATION (INPUT) | LAST-SET MODE (MODE-CHANGE CONDITION) | OPERATING MODE (OUTPUT) | ROTATIONAL SPEED OF MOTOR (OUTPUT) |
|---|---|---|---|---|
| 1 | POWER ON | — | NORMAL MODE | 3600rpm |
| 2 | INSTRUCTION FOR CHANGING TO SLEEP MODE | NORMAL MODE | SLEEP MODE | 1200rpm |
| 3 | INSTRUCTION FOR CHANGING TO NORMAL MODE | SLEEP MODE | NORMAL MODE | 3600rpm |
| 4 | TIME-UP | SLEEP MODE | SLEEP MODE | 1200rpm |

FIG. 7

| No. | DETECTION INFORMATION (INPUT) | LAST-SET MODE (MODE-CHANGE CONDITION) | OPERATING MODE (OUTPUT) | ROTATIONAL SPEED OF MOTOR (OUTPUT) |
|---|---|---|---|---|
| 1 | POWER ON | — | NORMAL MODE | 3600rpm |
| 2 | INSTRUCTION FOR CHANGING TO SLEEP MODE | NORMAL MODE | SLEEP MODE | 1200rpm |
| 3 | INSTRUCTION FOR CHANGING TO NORMAL MODE | SLEEP MODE | NORMAL MODE | 3600rpm |
| 4 | TIME-UP | SLEEP MODE, 1,200 rpm | SLEEP MODE | 800rpm |
| 5 | TIME-UP | SLEEP MODE, 800 rpm | SLEEP MODE | 400rpm |
| 6 | TIME-UP | SLEEP MODE, 400 rpm | SLEEP MODE | 0rpm |

LIGHT SOURCE APPARATUS

TECHNICAL FIELD

The present invention relates to a light source apparatus used for a projector that displays an image on a projection surface and, more specifically, relates to a light source apparatus using a rotating optical system that has LEDs (light emitting diodes) arranged around the circumference and that rotates an optical system rod relative to the LEDs in synchronization with the illumination of the LEDs.

BACKGROUND ART

Recently, spatial light modulators such as digital micromirror devices (DMD) for modulating illumination light by high-speed switching of micromirrors of pixels arranged in a matrix between angles corresponding to ON and OFF states according to pulse width modulation (PWM) driving based on image data have been used in small projectors.

Unlike a known liquid crystal display device, such a spatial light modulator is capable of high-speed operation, and is thus capable of displaying red (R), green (G), and blue (B) images in a frame sequential method. A projector using a liquid crystal display device requires three liquid crystal display (LCD) devices for displaying a color image, whereas a projector using a spatial light modulator is capable of color display with one DMD device.

In such a known projector using a spatial light modulator, a white light lamp has been used as a light source. For example, with a known projector using a spatial light modulator, an input image is converted into a frame-sequential image signal and supplied to the spatial light modulator; a color wheel colored in RGB is rotated in synchronization with a vertical sync signal of the input image; and the spatial light modulator is irradiated with light from the lamp via the color wheel. However, when a lamp is used as a light source of the projector, the power consumption becomes high and a color wheel is required.

On the other hand, recently, use of a LED as a light source of such a projector has been considered. An LED, compared with a lamp, has advantages such as a small size, high durability, long life, and low power consumption. By using three LEDs of RGB, a color wheel is not required, and excellent color characteristics can be achieved. Moreover, when a spatial light modulator is used, an optical system having a low-loss light source, such as an LED, generating non-polarized light can be easily constructed since, unlike a liquid crystal display device, such a spatial light modulator has no polarization dependency.

However, when an LED is driven with a direct current, there is a limit to the amount of electric current that can be applied to the LED. Thus, as described in, for example, Patent Document 1, the use of a rotating optical system has been proposed.

This rotating optical system includes a supporting member that supports a light source unit including a plurality of red, green, and blue LEDs arranged around the circumference and an optical system rod that rotates around the center axis about which the light source unit is arranged. In this rotating optical system, the plurality of LEDs is sequentially pulse-driven and the plurality of LEDs is sequentially pulse-illuminated. Then, the optical system rod is rotated around the axis in synchronization with the illumination of the LEDs, and light from the illuminated LEDs is collected and emitted towards the spatial light modulator.

Although there is a limit to the amount of electric current that can be applied when the LEDs are driven with a direct current, when a rotating optical system is used, the LEDs are pulse-driven, as described above. Therefore, a large current can be applied to the LEDs, thus achieving intense light emission. Furthermore, by using such a rotating optical system, light from the illuminated LEDs can be collected by the optical system rod, and light equivalent to that obtained when the LEDs are continuously illuminated can thus be obtained.

Patent Document 1: Japanese Unexamined Patent Application, Publication No. 2003-346503

DISCLOSURE OF INVENTION

However, when a rotating optical system, such as that described above, is used, it is necessary to rotate the optical system rod at a desired rotational speed in synchronization with a vertical sync signal of an input image. Therefore, such a known projector has a problem in that it is difficult to immediately display an image.

To display an image, first, a motor in a stopped state is started up and the rotational speed of the motor is increased. Then, the rotation of a rotating rod in the optical system is detected, the vertical sync signal of the input image signal is compared with the detection signal of the rotating rod in the optical system, and the rotational speed of the motor is increased to a desired rotational speed in synchronization with the vertical sync signal of the input image. When the rotational speed of the motor reaches the desired rotational speed in synchronization with the vertical sync signal of the input image, LEDs are sequentially illuminated at a desired timing to display the image. Therefore, to display an input image, a waiting time equal to at least the time until the motor reaches the desired rotational speed in synchronization with the vertical sync signal of the input image is required.

A characteristic of an LED is immediate illumination. In other words, a projector using LEDs is advantageous in that it immediately illuminates to display an image. However, as described above, when a rotating optical system is used, to display an input image, a waiting time equal to at least the time until the motor reaches the desired rotational speed in synchronization with the vertical sync signal of the input image is required, thus causing the immediate illumination advantage of the LEDs to be lost.

The present invention has been conceived in light of the problems described above. Accordingly, it is an object of the present invention to provide a light source apparatus that can immediately display an image and reduce power consumption.

To solve the above-described problems, the present invention provides a light source apparatus including a plurality of light sources arranged around a circumference; an optical unit for receiving illumination light emitted from one of the light sources disposed at a corresponding position by relatively rotating around a center axis about which the light sources are arranged; a motor for relatively rotating the optical unit and/or the plurality of light sources; a mode-setting unit for setting a first mode and a second mode; a motor controlling unit for controlling the rotational speed of the motor according to the first mode and the second mode; and a light-source controlling unit for controlling the illumination state of the light sources according to the first mode and the second mode, wherein, when the light sources are to be illuminated, the first mode is set, and when the light sources are to be extinguished, the second mode is set.

According to the present invention, in the second mode, the motor controlling unit may control the rotational speed of the motor to a rotational speed lower than the rotational speed of the motor in the first mode.

According to the present invention, in the second mode, the motor controlling unit may control the rotational speed of the motor so that the rotational speed is reduced with time.

According to the present invention, in the second mode, the motor controlling unit may carry out control to stop the motor after rotating the motor at a rotational speed lower than the rotational speed in the first mode for a predetermined amount of time.

According to the present invention, in the second mode, the motor controlling unit may carry out control to stop the motor after rotating the motor at a rotational speed lower than the rotational speed in the first mode for a predetermined amount of time.

According to the present invention, in the second mode, the motor controlling unit may carry out control to rotate the motor at a rotational speed lower than the rotational speed in the first mode after rotating the motor at the same rotational speed as the rotational speed in the first mode for a predetermined amount of time.

According to the present invention, when the mode setting unit detects the presence of an input signal and detects a state in which an input signal is present after a state in which an input signal is not present, the mode may be changed from the second mode to the first mode.

According to the present invention, the mode setting unit may include information related to the first mode and a lookup table storing information related to the second mode, and the first mode or the second mode may be set on the basis of detection information and a mode-changing condition input to the lookup table.

According to the present invention, the light source apparatus may further include a storage unit for storing a plurality of lookup tables of different types and a selecting unit for selecting one lookup table from the storage unit according to the level of power saving required by the light source apparatus, and control may be carried out in accordance with the selected lookup table.

According to the present invention, when a first mode (normal mode) or a second mode (sleep mode) can be selected and the first modes is set, a motor that relatively rotates optical unit and/or light sources at a desired rotational speed and the light sources disposed on a support member around the circumference are sequentially illuminated at a desired timing. When the second mode is set, the light sources are extinguished while the motor continues to be rotated.

In this way, according to the present invention, since the motor continues to rotate even when the second mode is set, when the mode is changed to the normal mode, the rotational speed of the motor can be immediately increased to the rotational speed in the normal mode to display an image. By rotating the motor in the second mode, advantages are achieved in that discomfort due to gyroscopic precession that occurs when the apparatus moves in this mode and the load applied to the motor shaft are reduced and power consumption is suppressed compared to when the motor is continuously rotated at a normal rotational speed.

In the second mode, power consumption can be reduced by extinguishing the light sources and reducing the rotational speed of the motor compared to that in the normal mode. Moreover, in the second mode, power consumption can be reduced by gradually lowering the rotational speed of the motor after a predetermined amount of time elapses. Furthermore, in the second mode, power consumption can be reduced by stopping the rotation of the motor after a predetermined amount of time elapses.

In this way, according to the present invention, a projector using a rotating optical system can suppress power consumption while the light sources are extinguished and can re-illuminate the light sources in a short amount of time.

BRIEF DESCRIPTION OF DRAWINGS

FIG. 3 illustrates a first example of a lookup table.

FIG. 4 illustrates a second example of a lookup table.

FIG. 5 illustrates a third example of a lookup table.

FIG. 6 illustrates a fourth example of a lookup table.

FIG. 7 illustrates a fifth example of a lookup table.

BEST MODE FOR CARRYING OUT THE INVENTION

Figure 1:
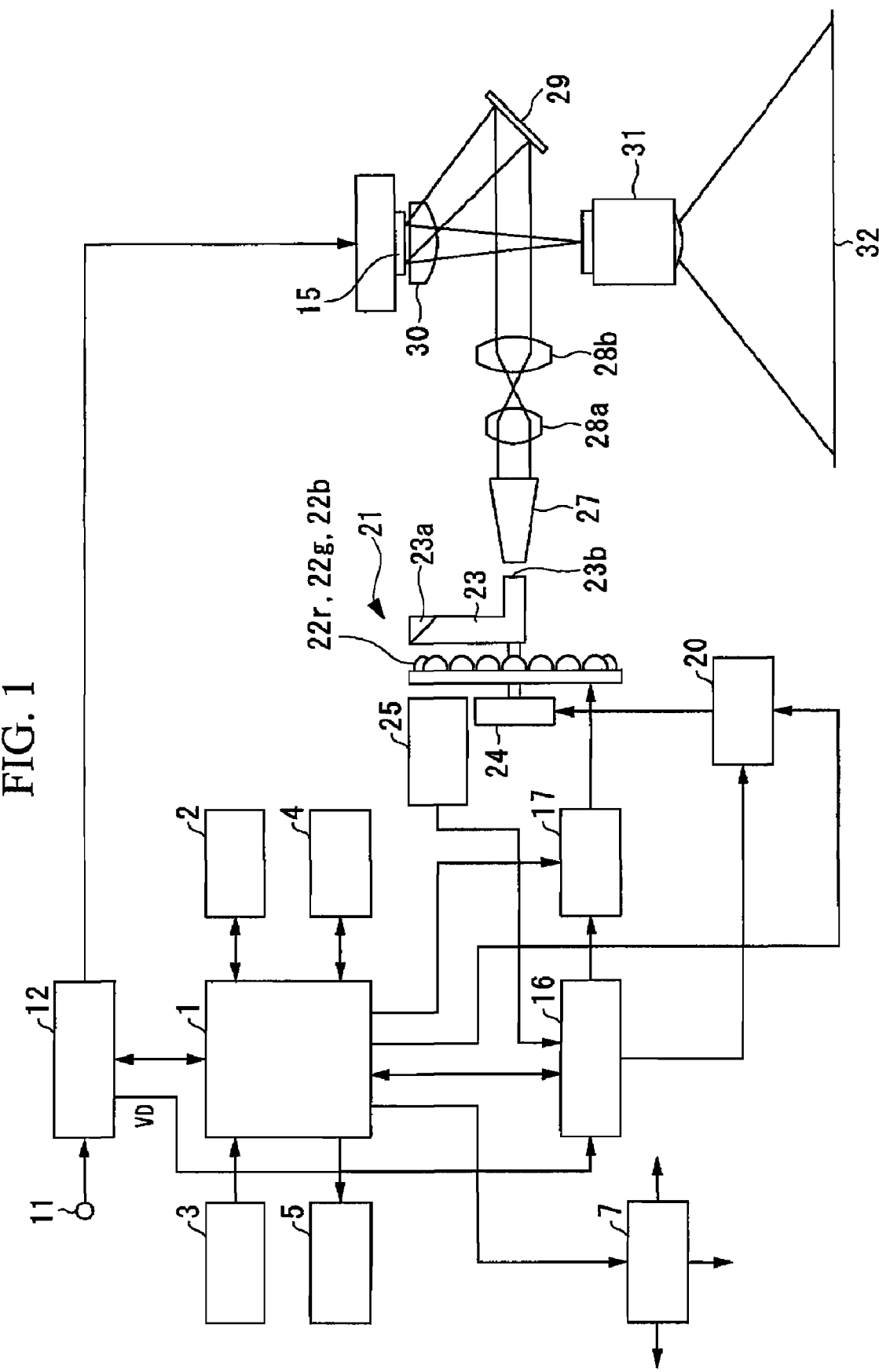
FIG. 1 is a block diagram illustrating the structure of a projector according to the present invention.

Embodiments of the present invention will be described below with reference to the drawings. FIG. 1 illustrates the structure of a projector according to the present invention. In FIG. 1, a control unit 1 is formed of a central processing unit (CPU) and controls the overall operation of the projector. The control unit 1 is connected to a storage unit 2, an external-information input unit 3, a time monitoring unit 4, and an internal-information output unit 5. The projector according to the present invention can be set to a normal mode (first mode) or a sleep mode (second mode). The settings for the normal mode and the sleep mode are configured by the control unit 1.

The storage unit 2 is provided with lookup tables. A lookup table is a table that receives detection information as an input and outputs an operating mode and the rotational speed of the motor, where the last-set mode is the mode-change condition.

The external-information input unit 3 detects asynchronous information from external units, such as information about operations performed by an operator, and notifies the control unit 1. The external-information input unit 3 includes an operation panel and remote controller for carrying out various settings. Detection information provided by the external-information input unit 3 when operated by an operator includes power-on information, sleep-mode instruction information that instructs a mode change to the sleep mode, and normal-mode instruction information that instructs a mode change to the normal mode.

The time monitoring unit 4 starts a monitoring timer according to an instruction from the control unit 1 and notifies the control unit 1 after an instructed amount of time elapses. The time monitoring unit 4 measures the amount of time that has past after the sleep mode has been set. In this way, time-up information is obtained.

The internal-information output unit 5 notifies an external unit about the status in the apparatus according to an instruction from the control unit 1 by using an LED indicator and so on. Information provided to the external unit includes mode-setting information about whether the current control mode of the apparatus is the normal mode or the sleep mode.

Figure 2:
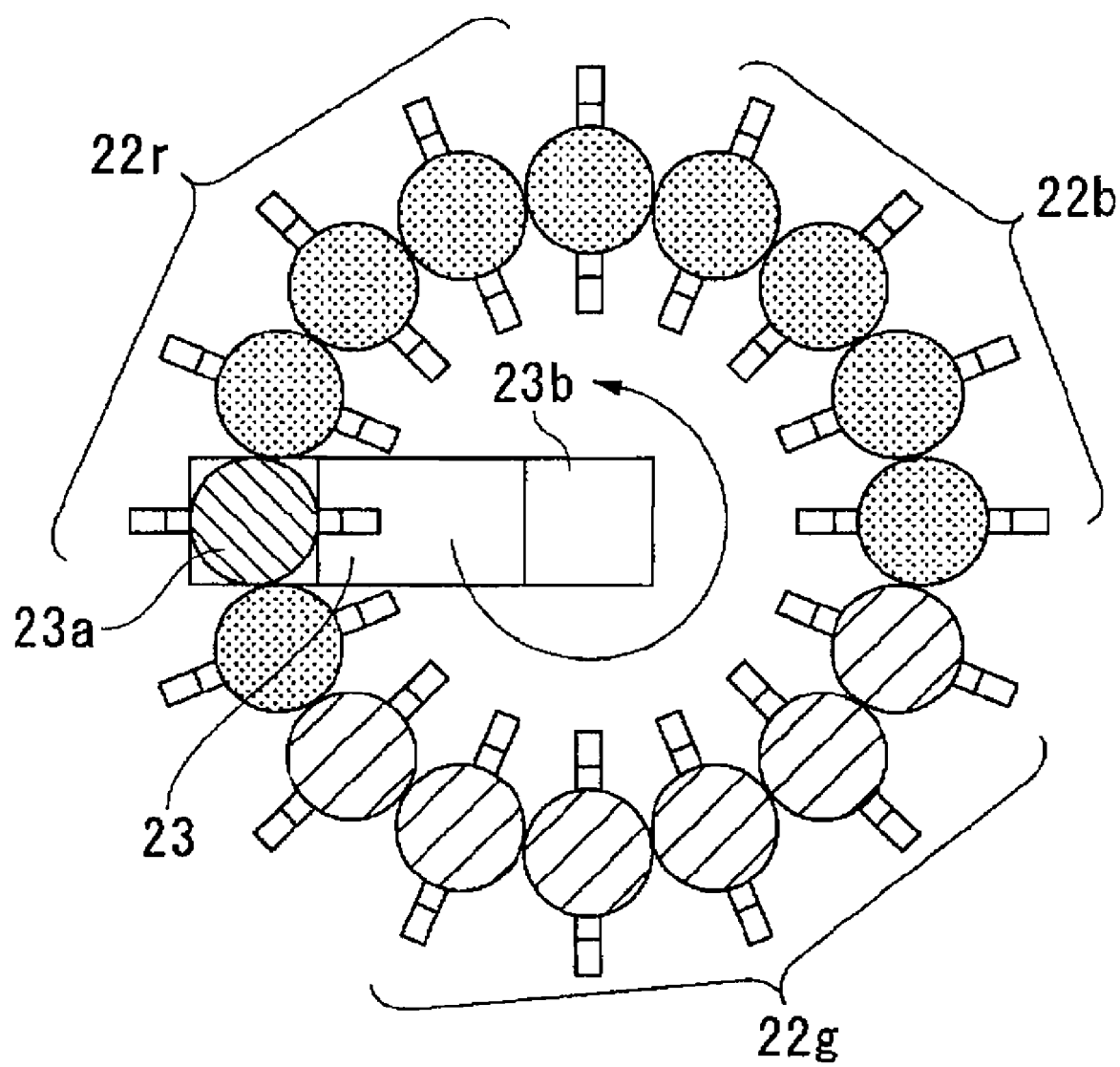
FIG. 2 illustrates a rotating optical system of the projector according to the present invention.

A projector according to the present invention uses a rotating optical system 21 that includes a light source unit having a plurality of red LEDs 22r, a plurality of green LEDs 22g, and a plurality of blue LEDs 22b arranged around the circumference, as show in FIG. 2, a supporting member (not shown) that supports the light source unit, and a rotating rod 23 that is rotated around the center axis on which the light source unit is arranged. The LEDs 22r, 22g, and 22b are sequentially illuminated. The rotating rod 23 is rotated by a motor 24 (FIG. 1). The rotating rod 23 extends in the radius direction from the shaft end of the motor 24 in cantilever-like manner. The free end of the rotating rod 23 is disposed such that it faces the LEDs in the axial direction. The free end of the rotating rod 23 has an incident end 23a for receiving illumination light emitted from the LEDs. By rotating the rotating rod 23 around the shaft in synchronization with the illumination timing of the plurality of LEDs 22r, 22g, and 22b arranged around the circumference, the illumination light generated at the LEDs 22r, 22g, and 22b facing the incident end 23a of the rotating rod 23 enters the rotating rod 23 from the incident end 23a.

When the projector according to the present invention, as shown in FIG. 1, is in the normal mode, according to an instruction from the control unit 1, the motor 24 is rotated at a desired speed in synchronization with a vertical sync signal of the input image signal. When in the normal mode, a driving current is applied to the above-described LEDs 22r, 22g, and 22b at a predetermined timing. When in the sleep mode, the motor 24 is rotated on the basis of information in the lookup table of the storage unit 2. Then, the LEDs 22r, 22g, and 22b are extinguished.

With the projector according to the present invention, the ON/OFF state of the power of the entire apparatus can be controlled by a power control unit 7 according to a power-setting instruction from the control unit 1.

As shown in FIG. 1, in the normal mode, an image signal is supplied to an input terminal 11. The image signal from the input terminal 11 is sent to a DMD drive control unit 12. The DMD drive control unit 12 carries out image signal processing such as sync separation, YC separation, IP conversion, resolution conversion, color conversion, and keystone correction on various input image signals in accordance with the form of the input image signal. Here, YC separation is a process of separating a luminance signal and a chroma signal. IP conversion is a conversion from interlace scanning to progressive scanning. Subsequently, the DMD drive control unit 12 carries out conversion processing of the field frequency of the input image signal for preventing color shifting and then forms a frame-sequential RGB image signal based on the input image signal. This frame-sequential image signal is supplied to a DMD element 15 as a DMD drive signal.

The DMD drive control unit 12 and the control unit 1 are connected in a bi-directional manner. Input-image detection information, such as the presence of an input image signal, image size, and image format, is sent from the DMD drive control unit 12 to the control unit 1.

The DMD element 15 is a spatial light modulator having a plurality of micromirrors disposed on its surface and being capable of changing the angles of the micromirrors for each pixel. When the DMD drive signal from the DMD drive control unit 12 is supplied to the DMD element 15, the angles of the micromirrors on the surface of the DMD element 15 are changed to change the path of light in order to turn the light on or off in units of pixels.

A vertical sync signal VD separated at the DMD drive control unit 12 is supplied to a timing generator 16. At the timing generator 16, a drive pulse for the LEDs is generated on the basis of the vertical sync signal of the input image signal. This drive pulse for the LEDs is supplied to an LED drive unit 17. The LED drive unit 17 sequentially supplies a drive current to the LEDs 22r, 22g, and 22b included in the rotating optical system 21. In this way, the LEDs 22r, 22g, and 22b are sequentially illuminated on the basis of the vertical sync signal of the input image signal.

A motor drive signal is generated at the timing generator 16. This motor drive signal is supplied to a motor drive unit 20. In this way, the motor 24 is rotated, and the rotating rod 23 is rotated.

The rotation of the rotating rod 23 is detected by a rotation sensor 25. A rotation detection signal from the rotation sensor 25 is supplied to the timing generator 16. At the timing generator 16, the rotation detection signal from the rotation sensor 25 and the vertical sync signal of the input image signal are compared, and based on a comparison signal, a motor drive signal is generated. In this way, the rotation of the motor 24 is controlled in synchronization with the vertical sync signal of the input image signal such that a desired rotational speed is reached.

The rotation of the motor 24 causes the incident end 23a of the rotating rod 23 to rotate along the plurality of LEDs 22r, 22g, and 22b arranged around the circumference. The rotation of the rotating rod 23 causes illumination light generated at an LED, among the plurality of LEDs 22r, 22g, and 22b, disposed at a position corresponding to the position of the incident end 23a of the rotating rod 23 to be received, and the light is guided out from an emission end 23b of the rotating rod 23.

The light emitted from the emission end 23b of the rotating rod 23 is incident on a beam-shape conversion device 27. The light emitted from an emission end of the beam-shape conversion device 27 is incident on the surface provided with the micromirrors of the DMD element 15 via an illumination optical system including illumination lenses 28a and 28b, a mirror 29, and a field lens 30.

The angles of the micromirrors on the surface of the DMD element 15 are changed by the DMD drive signal to change the path of the light. Therefore, the reflected light from the DMD element 15 is modulated in units of pixels by the DMD drive signal from the DMD drive control unit 12. The light modulated by the DMD drive signal is expanded through a projection lens 31 and is projected onto a projection surface 32 as projection light. In this way, an image is projected on the projection surface 32.

FIGS. 3 to 7 illustrate configuration examples of lookup tables of the storage unit 2. As shown in FIGS. 3 to 7, the lookup table is a table that receives detection information as an input and outputs an operating mode and the rotational speed of the motor, where the last-set mode is the mode-change condition. Here, the detection information is power-on information and mode instruction information (sleep-mode instruction information and normal-mode instruction information) obtained from the information about operations performed on the external-information input unit 3 by the operator, input-image detection information obtained from the DMD drive control unit 12, and time-up information obtained from the time monitoring unit 4.

When a lookup table having a configuration such as that shown in FIG. 3 is used, the following control is carried out.

1-1 Power On

When power is turned on, from the LUT number "1", the operation mode is determined to be the normal mode. In the normal mode, the LEDs 22r, 22g, and 22b are illuminated at a desired timing. Then, the motor 24 is rotated at, for example, 3,600 rpm in synchronization with the vertical sync signal of the input image signal.

1-2 Instruction for Changing to Sleep Mode

When sleep-mode instruction information is input from the external-information input unit 3 by an operator to instruct changing to the sleep mode, from the LUT number "2", the operating mode is determined to be the sleep mode if the last-set mode is the normal mode. In the sleep mode, all of the LEDs 22r, 22g, and 22b are extinguished. Then, the motor 24 is rotated at, for example, 1,200 rpm. Furthermore, when the mode is changed to the sleep mode, the monitoring timer of the time monitoring unit 4 is started.

1-3 Instruction for Changing to Normal Mode

When normal-mode instruction information is input from the external-information input unit 3 by the operator to instruct changing to the normal mode, from the LUT number "3", the operating mode is determined to be the normal mode if the last-set mode is the sleep mode. In the normal mode, the LEDs 22r, 22g, and 22b are sequentially illuminated at a desired timing. Then, the motor 24 is rotated at, for example, 3,600 rpm in synchronization with the vertical sync signal of the input image signal.

1-4 Termination of Image Input Signal

When it is determined that the image input signal is terminated based on the input image detection information obtained from the DMD drive control unit 12, from the LUT number "4", the operating mode is determined to be the sleep mode if the last-set mode is the normal mode and an image input signal is supplied. In the sleep mode, the LEDs 22r, 22g, and 22b are extinguished. Then, the motor 24 is rotated at, for example, 1,200 rpm. Furthermore, when the mode is changed to the sleep mode, the monitoring timer of the time monitoring unit 4 is started.

1-5 Detection of Image Input Signal

When the image input signal is detected in the input image detection information obtained from the DMD drive control unit 12, from the LUT number "5", the operating mode is determined to be the normal mode if the last-set mode is the sleep mode and an image input signal is not supplied. In the normal mode, the LEDs 22r, 22g, and 22b are illuminated at a desired timing. Then, the motor 24 is rotated at, for example, 3,600 rpm in synchronization with the vertical sync signal of the input image signal.

1-6 Predetermined Amount of Time Elapsing without Input Signal

When the mode is changed to the sleep mode, the monitoring timer of the time monitoring unit 4 is started. When the time-up condition of the monitoring timer is detected, from the LUT number "6", the rotation of the motor 24 is terminated (0 rpm) if the last-set mode is the sleep mode and an image input signal is not supplied.

When a lookup table having a configuration such as that shown in FIG. 4 is used, the following control is carried out.

2-1 Power On

When power is turned on, from the LUT number "1", the operating mode is determined to be the normal mode. In the normal mode, the LEDs 22r, 22g, and 22b are illuminated at a desired timing. Then, the motor 24 is rotated at, for example, 3,600 rpm in synchronization with the vertical sync signal of the input image signal.

2-2 Instruction for Changing to Sleep Mode

When sleep-mode instruction information is input from the external-information input unit 3 by an operator to instruct changing to the sleep mode, from the LUT number "2", the operating mode is determined to be the sleep mode if the last-set mode is the normal mode. In the sleep mode, the LEDs 22r, 22g, and 22b are extinguished. Then, the motor 24 is rotated at, for example, 1,200 rpm. Furthermore, when the mode is changed to the sleep mode, the monitoring timer of the time monitoring unit 4 is started.

2-3 Instruction for Changing to Normal Mode

When normal-mode instruction information is input from the external-information input unit 3 by the operator to instruct changing to the normal mode, from the LUT number "3", the operating mode is determined to be the normal mode if the last-set mode is the sleep mode. In the normal mode, the LEDs 22r, 22g, and 22b are illuminated at a desired timing. Then, the motor 24 is rotated at, for example, 3,600 rpm in synchronization with the vertical sync signal of the input image signal.

2-4 Predetermined Amount of Time Elapsed in Sleep Mode

When the time-up condition of the monitoring timer of the time monitoring unit 4 is detected, from the LUT number "4", the rotation of the motor 24 is terminated (0 rpm) if the last-set mode is the sleep mode.

When a lookup table having a configuration such as that shown in FIG. 5 is used, the following control is carried out.

3-1 Power On

When power is turned on, from the LUT number "1", the operating mode is determined to be the normal mode. In the normal mode, the LEDs 22r, 22g, and 22b are illuminated at a desired timing. Then, the motor 24 is rotated at, for example, 3,600 rpm in synchronization with the vertical sync signal of the input image signal.

3-2 Instruction for Changing to Sleep Mode

When sleep-mode instruction information is input from the external-information input unit 3 by an operator to instruct changing to the sleep mode, from the LUT number "2", the operating mode is determined to be the sleep mode if the last-set mode is the normal mode. In the sleep mode, the LEDs 22r, 22g, and 22b are extinguished. Then, the motor 24 is rotated at, for example, 3,600 rpm (no change in the rotational speed). Furthermore, when the mode is changed to the sleep mode, the monitoring timer of the time monitoring unit 4 is started.

3-3 Instruction for Changing to Normal Mode

When normal-mode instruction information is input from the external-information input unit 3 by the operator to instruct changing to the normal mode, from the LUT number "3", the operating mode is determined to be the normal mode if the last-set mode is the sleep mode. In the normal mode, the LEDs 22r, 22g, and 22b are illuminated at a desired timing. Then, the motor 24 is rotated at, for example, 3,600 rpm (no change in the rotational speed) in synchronization with the vertical sync signal of the input image signal.

3-4 Predetermined Amount of Time Elapsed in Sleep Mode

When the time-up condition of the monitoring timer of the time monitoring unit 4 is detected, from the LUT number "4", the rotation of the motor 24 is terminated (0 rpm) if the last-set mode is the sleep mode.

When a lookup table having a configuration such as that shown in FIG. 6 is used, the following control is carried out.

4-1 Power On

When power is turned on, from the LUT number "1", the operating mode is determined to be the normal mode. In the normal mode, the LEDs 22r, 22g, and 22b are illuminated at a desired timing. Then, the motor 24 is rotated at, for example, 3,600 rpm in synchronization with the vertical sync signal of the input image signal.

4-2 Instruction for Changing to Sleep Mode

When sleep-mode instruction information is input from the external-information input unit 3 by an operator to instruct changing to the sleep mode, from the LUT number "2", the operating mode is determined to be the sleep mode if the last-set mode is the normal mode. In the sleep mode, the LEDs 22r, 22g, and 22b are extinguished. Then, the motor 24 is rotated at, for example, 3,600 rpm (no change in the rotational speed). Furthermore, when the mode is changed to the sleep mode, the monitoring timer of the time monitoring unit 4 is started.

4-3 Instruction for Changing to Normal Mode

When normal-mode instruction information is input from the external-information input unit 3 by the operator to instruct changing to the normal mode, from the LUT number "3", the operating mode is determined to be the normal mode if the last-set mode is the sleep mode. In the normal mode, the LEDs 22r, 22g, and 22b are illuminated at a desired timing. Then, the motor 24 is rotated at, for example, 3,600 rpm (no change in the rotational speed) in synchronization with the vertical sync signal of the input image signal.

4-4 Predetermined Amount of Time Elapsed in Sleep Mode

When the time-up condition of the monitoring timer of the time monitoring unit 4 is detected, from the LUT number "4", the motor 24 is rotated at 1,200 rpm if the last-set mode is the sleep mode.

When a lookup table having a structure such as that shown in FIG. 7 is used, the following control is carried out.

5-1 Power On

When power is turned on, from the LUT number "1", the operating mode is determined to be the normal mode. In the normal mode, the LEDs 22r, 22g, and 22b are illuminated at a desired timing. Then, the motor 24 is rotated at, for example, 3,600 rpm in synchronization with the vertical sync signal of the input image signal.

5-2 Instruction for Changing to Sleep Mode

When sleep-mode instruction information is input from the external-information input unit 3 by an operator to instruct changing to the sleep mode, from the LUT number "2", the operating mode is determined to be the sleep mode if the last-set mode is the normal mode. In the sleep mode, the LEDs 22r, 22g, and 22b are extinguished. Then, the motor 24 is rotated at, for example, 1,200 rpm. Furthermore, when the mode is changed to the sleep mode, the monitoring timer of the time monitoring unit 4 is started.

5-3 Instruction for Changing to Normal Mode

When normal-mode instruction information is input from the external-information input unit 3 by the operator to instruct changing to the normal mode, from the LUT number "3", the operating mode is determined to be the normal mode if the last-set mode is the sleep mode. In the normal mode, the LEDs 22r, 22g, and 22b are illuminated at a desired timing. Then, the motor 24 is rotated at, for example, 3,600 rpm in synchronization with the vertical sync signal of the input image signal.

5-4 Predetermined Amount of Time Elapsed in Sleep Mode

When the time-up condition of the monitoring timer of the time monitoring unit 4 is detected, the monitoring timer is started. Then, from the LUT number "4", the motor 24 is rotated at 800 rpm if the last-set rotational speed of the motor is 1,200 rpm.

From the LUT number "5", the motor 24 is rotated at 400 rpm if the last-set rotational speed of the motor is 800 rpm.

From the LUT number "6", the rotation of the motor 24 is terminated (0 rpm) if the last-set rotational speed of the motor is 400 rpm.

Depending on which type of lookup table is to be used, among lookup tables having configurations such as those illustrated in FIGS. 3 to 7, the rotational speed according to the control mode and the control timing can be changed.

Here, several lookup tables set in advance may be arbitrarily selected by an instruction from the operator or the rotational speed defined by the lookup table may be arbitrarily changed.

Figure 8:
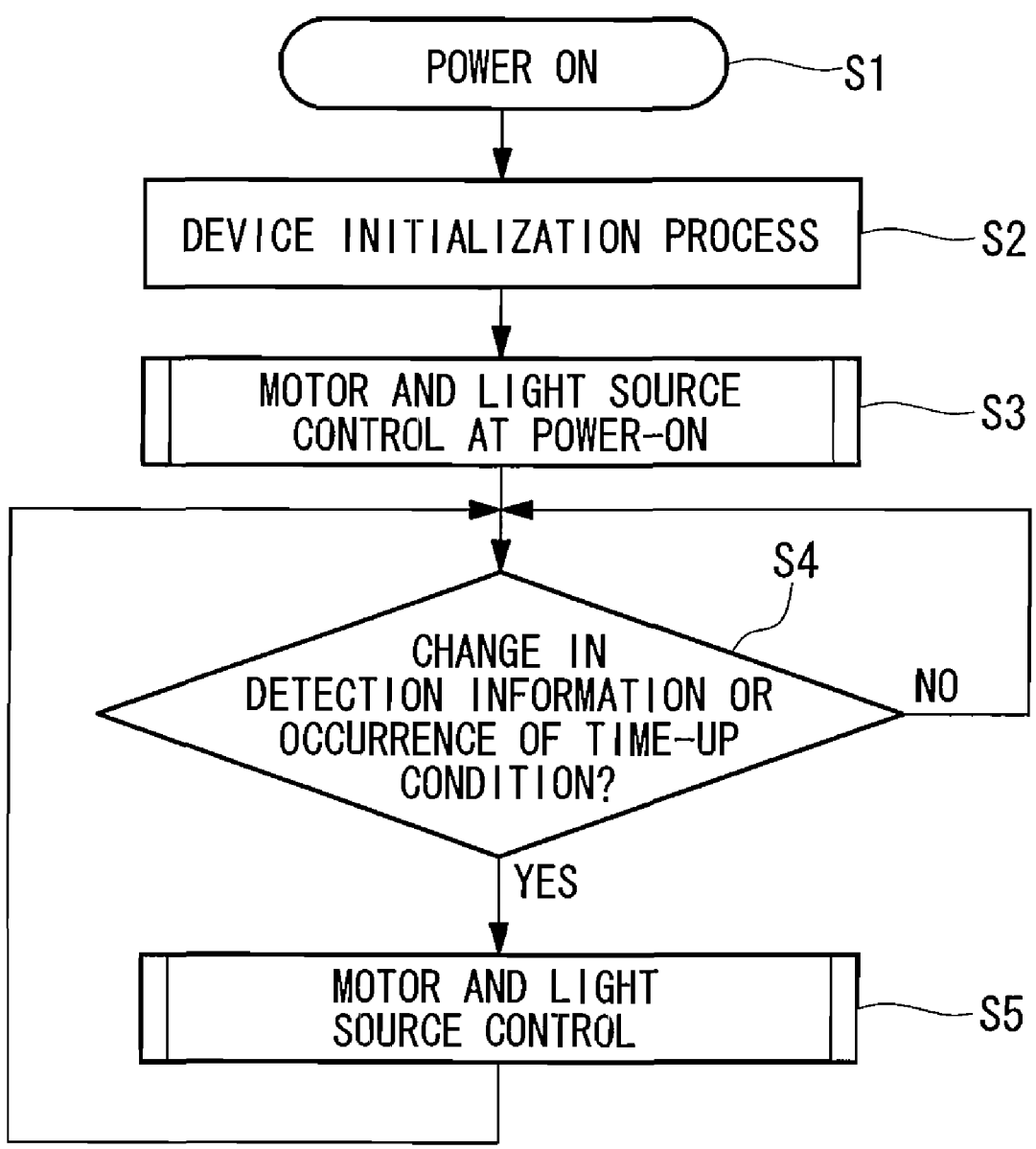
FIG. 8 is a flow chart illustrating examples of modes and motor control of the projector according to the present invention.
Figure 9:
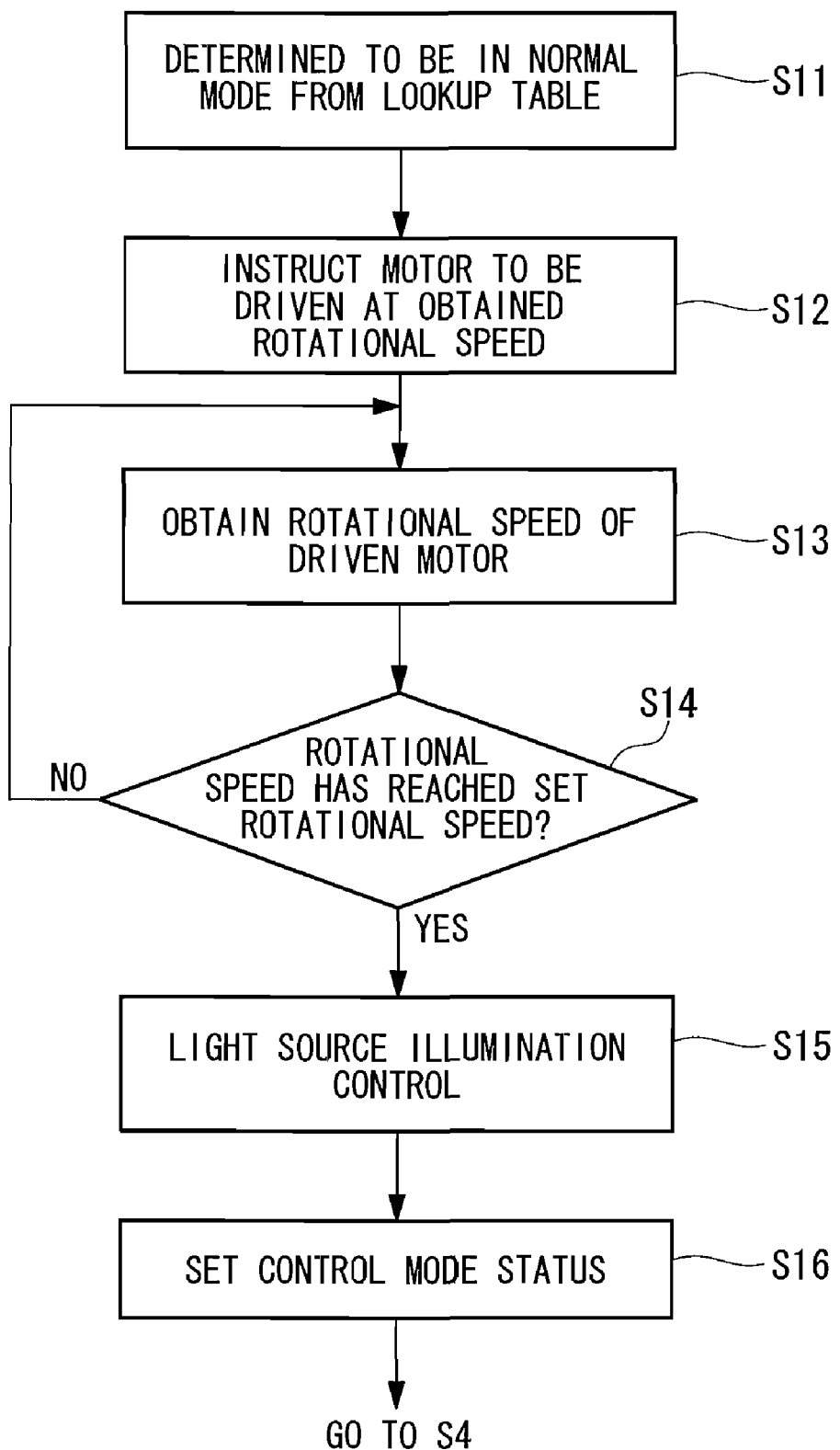
FIG. 9 is a flow chart illustrating examples of modes and motor control of the projector according to the present invention.
Figure 10:
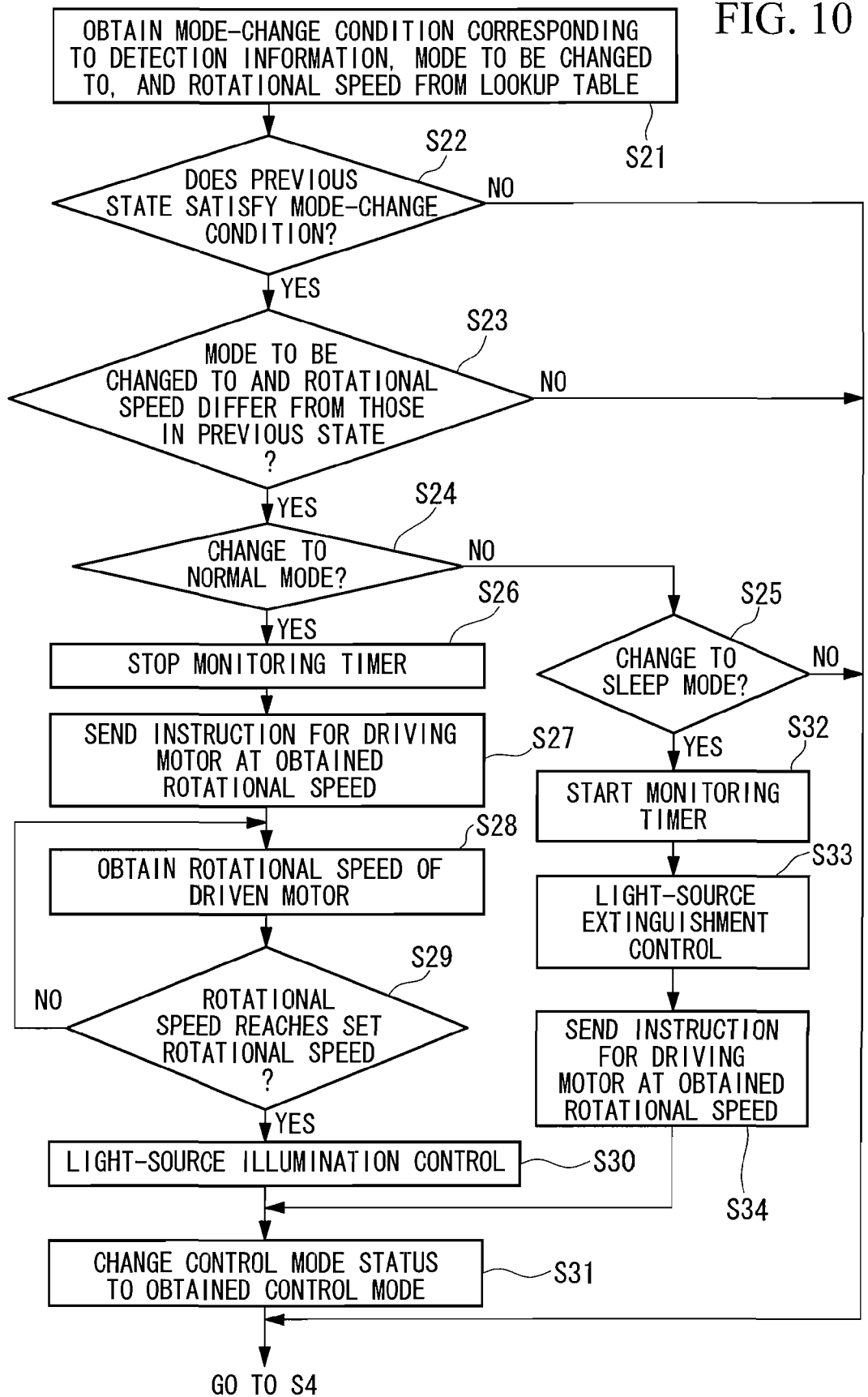
FIG. 10 is a flow chart illustrating examples of modes and motor control of the projector according to the present invention.

FIGS. 8 to 10 are flow charts illustrating examples of the modes and motor control for the projector according the present invention. In FIG. 8, when the power is turned on (Step S1), the control unit 1 initializes the devices installed in the apparatus (Step S2). Then, motor control and light-source illumination control are carried out at power-on (Step S3).

When the power is turned on, from the lookup table shown in FIGS. 3 to 7, the normal mode is set. At this time, the process shown in FIG. 9 is carried out as the motor control and light-source illumination control in Step S3.

In FIG. 9, at power-on, if it is determined based on the lookup table that the normal mode is set (Step S11), the motor 24 is rotated at the rotational speed obtained from the lookup table (Step S12). The rotational speed of the motor 24 is obtained from the rotation detection signal from the rotation sensor 25 (Step S13), and it is determined whether the motor 24 has reached the desired rotational speed (Step S14). When the motor 24 reaches the desired rotational speed in synchronization with the input image signal, the LEDs 22r, 22g, and 22b are sequentially illuminated at a desired timing (Step S15). Then, the control mode status is set to the normal mode (Step S16).

In Step S3 in FIG. 8, when the motor control and light-source illumination control are carried out at power-on according to the process shown in FIG. 9, the detection information and the monitoring counter of the time monitoring unit 4 are monitored, and then it is determined whether there is a change in the detection information or if the time-up condition has occurred (Step S4).

Here, if the detection information has not changed and the time-up condition has not occurred, the currently set control mode is maintained, and the motor control and the light-source illumination control are continued according to the set control mode. If the detection information changes or the time-up condition occurs, the motor control and the light-source illumination control are carried out according to the changed control mode (Step S5).

FIG. 10 is a flow chart illustrating the details of the motor control and the light-source illumination control of Step S5. In FIG. 10, a mode-change condition corresponding to the detection information, the control mode for when the mode is changed, and the rotational speed of the motor are obtained from the lookup table (Step S21).

Then, it is determined whether the previous state of the apparatus satisfies the mode-change condition obtained from the lookup table (Step S22). If the previous state of the apparatus does not satisfy the mode-change condition, the process is interrupted to return to the process of monitoring external information shown in FIG. 8 (Step S4).

When the previous state of the apparatus satisfies the mode-change condition, it is determined whether or not there are changes in the operating mode and the rotational speed of the motor obtained from the lookup table compared with the previous state of the apparatus (Step S23). In Step S23, if there are no changes in the control mode and the rotational speed of the motor, it is determined that there is no change in the state and the process is interrupted to return to the process of monitoring external information shown in FIG. 8 (Step S4).

In Step S23, if there are changes in the control mode and the rotational speed of the motor, it is determined whether or not the mode is to be changed to the normal mode (Step S24). If the mode is not to be changed to the normal mode, it is determined whether or not the mode is to be changed to the sleep mode (Step S25).

In Step S24, if the mode is to be changed to the normal mode, an instruction for stopping the monitoring timer is sent to the time monitoring unit 4 (Step S26). Then, an instruction for driving the motor at a rotational speed obtained from the lookup table is sent to the timing generator 16 (Step S27). Then, the rotational speed of the motor 24 is obtained from the rotation detection signal from the rotation sensor 25 (Step S28), and it is determined whether the motor 24 has reached a desired rotational speed (Step S29). When the motor 24 reaches the desired rotational speed in synchronization with the vertical sync signal of the input image signal, the LEDs 22r, 22g, and 22b are sequentially illuminated at a desired timing (Step S30). Finally, after the control mode status immediately before carrying out the process is changed to the obtained control mode (Step S31), the process is returned to the process of monitoring external information shown in FIG. 8 (Step S4) again.

In Step S25, if the mode is to be changed to the sleep mode, an instruction for starting the monitoring timer is sent to the time monitoring unit 4 (Step S32). Then, the LEDs 22r, 22g, and 22b are extinguished (Step S33), and the motor 24 is rotated at a rotational speed obtained from the lookup table (Step S34). Finally, after the control mode status is set to the changed control mode (Step S31), the process is returned to the process of monitoring external information shown in FIG. 8 (Step S4) again.

As described above, according to the embodiments of the present invention, lookup tables that receive detection information as an input and output an operating mode and the rotational speed of the motor, where the last-set mode is the mode-change condition, are provided. Then, by using these lookup tables, the normal mode or the sleep mode is set, illumination or extinguishment of the LEDs 22r, 22g, and 22b is set for each mode, and the rotational speed of the motor 24 is set.

In other words, when the normal mode is set, the motor 24 is rotated at a desired rotational speed in synchronization with the vertical sync signal of the input image signal and the LEDs 22r, 22g, and 22b are sequentially illuminated at a desired timing. When the sleep mode is set, the motor 24 continues to rotate, and the LEDs 22r, 22g, and 22b are extinguished.

In this way, according to the embodiments of the present invention, since the motor 24 is rotating also in the sleep mode, when the mode is changed to the normal mode, the rotational speed of the motor 24 can be immediately increased to the rotational speed in the normal mode, the LEDs 22r, 22g, and 22b can be sequentially illuminated, and an image can be displayed. By rotating the motor 24 in the sleep mode, advantages are achieved in that discomfort due to gyroscopic precession that occurs when the apparatus moves in this mode and the load applied to the motor shaft are reduced and power consumption is suppressed compared to when the motor is continuously rotated at a normal rotational speed.

Then, when the lookup table shown in FIG. 3 is used, in the sleep mode, the rotational speed of the motor 24 is lowered more than the rotational speed in the normal mode to reduce power consumption. After a predetermined amount of time from setting the sleep mode, the rotation of the motor 24 is stopped to further reduce power consumption. When the presence of the input image signal is detected and the state changes from an input-image-signal present state to an input-image-signal not-present state, the sleep mode is set.

When the lookup table shown in FIG. 4 is used, in the sleep mode, the rotational speed of the motor 24 is lowered more than the rotational speed in the normal mode to reduce power consumption. Then, after a predetermined amount of time from setting the sleep mode, the rotation of the motor 24 is stopped to further reduce power consumption.

When the lookup table shown in FIG. 5 is used, in the sleep mode, the motor 24 is rotated at the same rotational speed as in the normal mode. Then, after a predetermined amount of time from setting the sleep mode, the rotation of the motor 24 is stopped to reduce power consumption.

When the lookup table shown in FIG. 6 is used, in the sleep mode, the motor 24 is rotated at the same rotational speed as in the normal mode. Then, after a predetermined amount of time from setting the sleep mode, the rotation of the motor 24 is lowered to reduce power consumption.

When the lookup table shown in FIG. 7 is used, in the sleep mode, the rotational speed of the motor 24 is lowered more than the rotational speed in the normal mode to reduce power consumption. Moreover, when the mode is set to the sleep mode, the rotational speed of the motor 24 is lowered as time elapses to further reduce power consumption. Finally, when the mode is set to the sleep mode, after a predetermined amount of time, the rotation of the motor 24 is lowered to reduce power consumption.

As described above, by using the lookup tables shown in FIGS. 3 to 7, power consumption can be reduced. However, the efficiency of reducing power consumption is greater for the table shown in FIG. 6 compared to that shown in FIG. 5, greater for the table shown in FIG. 5 compared to that shown in FIG. 7, and greater for the tables shown in FIGS. 3 and 4 compared to that shown in FIG. 7. Therefore, when selecting a lookup table to be used for control from the storage unit 2, the lookup table may be selected on the basis of the level of power saving required by the projector. For example, if power is supplied to the projector from a battery, the lookup table may be changed according to the detected remaining battery power. In other words, when the remaining battery power is large, the lookup table in FIG. 6 may be used, and as the remaining battery power decreases, the lookup table may be changed, in order, to those in FIGS. 5, 7, 3, and 4. Instead, a power-saving-mode setting switch that can be operated by an operator may be provided on the external-information input unit 3 so that the operator may change the lookup table according to the level of power saving required by the projector.

Figure 11:
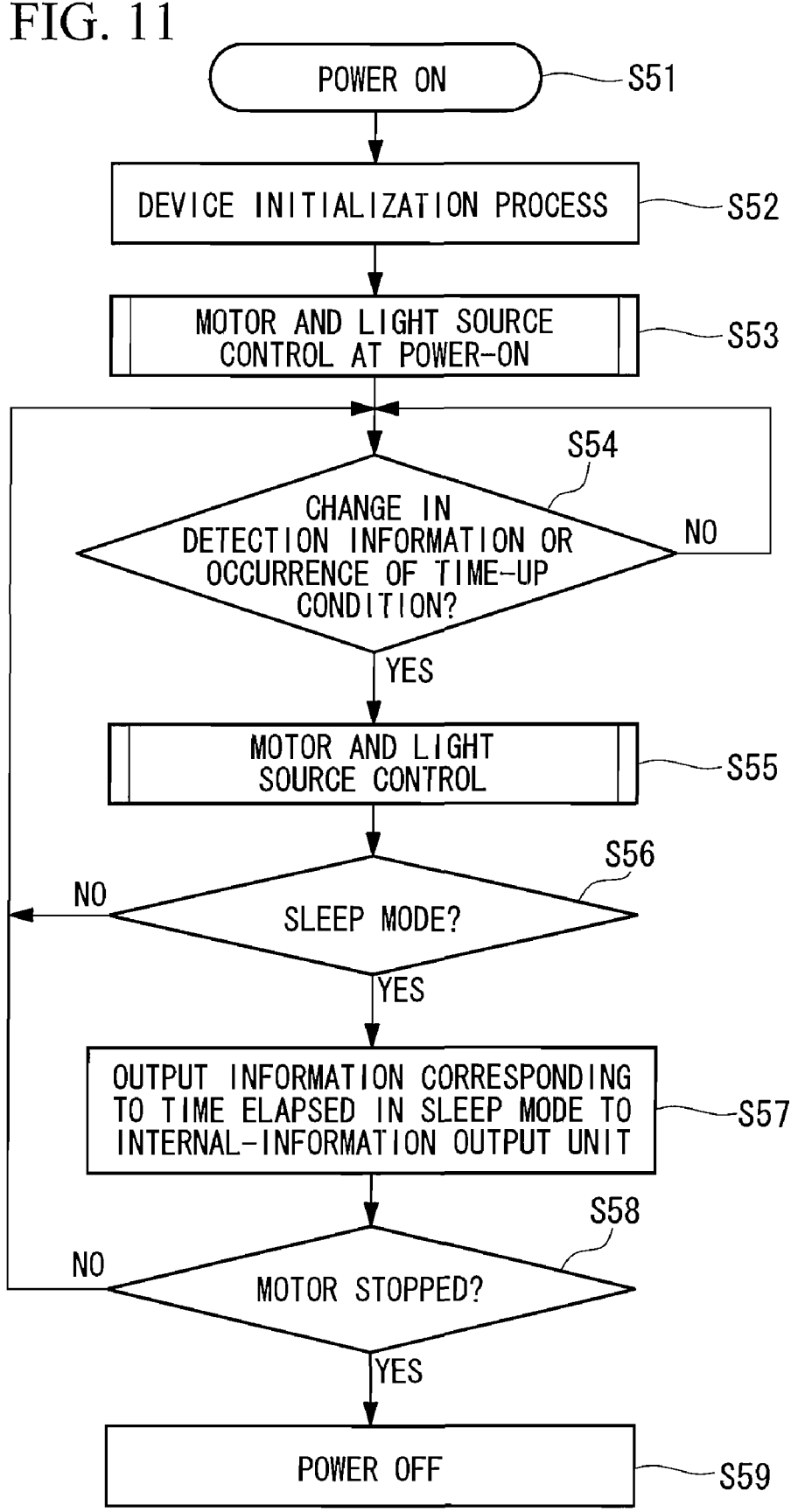
FIG. 11 is a flow chart illustrating other examples of modes and motor control of the projector according to the present invention.

FIG. 11 is a flow chart illustrating another example of the modes and motor control of the projector according the present invention. According to this embodiment, the time from setting the sleep mode is displayed by an indicator, and a function for turning the power off when the motor 24 is stopped upon entering the sleep mode is added.

In FIG. 11, when the power is turned on, power-on information from the external-information input unit 3 is sent to the control unit 1 (Step S51). The control unit 1 initializes that devices installed in the apparatus when the power is turned on (Step S52). Then, motor control and light-source illumination control are carried out (Step S53).

When the power is turned on, from the lookup tables in FIGS. 3 to 7, the normal mode is set. At this time, the processing shown in FIG. 9 is carried out.

In Step S53, when motor control and light-source illumination control are carried out according to the set control mode in accordance with the process shown in FIG. 9, detection information and the monitoring counter of the time monitoring unit 4 are monitored, and it is determined whether the detection information has changed or a time-up condition has occurred (Step S54).

Here, if the detection information has not changed and a time-up condition has not occurred, the currently set mode is maintained, and the motor control and the light-source illumination control are continued according to the set control mode. If the detection information changes or if the time-up condition occurs, the motor control and the light-source illumination control are carried out according to the control mode to be changed to (Step S55). The motor control and the light-source illumination control in Step S55 are the same processes as that shown in FIG. 10.

Then, it is determined whether the mode is the sleep mode (Step S56). If the mode is not the sleep mode, the process returns to the process of monitoring external information (Step S54), whereas if the mode is the sleep mode, information corresponding to the amount of time elapsed in the sleep mode is output to the internal-information output unit 5 (Step S57). For example, if an LED indicator is used as the internal-information output unit 5, when the sleep mode is entered, the LED indicator is illuminated, and the blinking frequency of the LED indicator will be increased according to the amount of time elapsed in the sleep mode. Then, it is determined whether the motor 24 is stopped (Step S58). If the motor 24 is not stopped, the process returns to the process for monitoring external information (Step S54), whereas if the motor 24 is stopped, the power is turned off (Step S59).

In this way, according to this embodiment, a function for turning off the power when the motor 24 is stopped after entering the sleep mode is added. In this way, by adding the function for finally turning off the power, unnecessary power consumption can be suppressed when the apparatus is not used for a long time or when one forgets to turn off the power. Then, by outputting information corresponding to the amount of time elapsed in the sleep mode to the internal-information output unit 5, the remaining time until the power is turned off can be visually notified to the operator.

The present invention is not limited to the above-described embodiments, and various modifications may be made so long as they do not depart from the spirit of the invention.

INDUSTRIAL APPLICABILITY

The present invention provides a light source apparatus that uses a rotating optical system including LEDs arranged around the circumference and an optical system rod which is rotated in synchronization with the illumination of the LEDs. The light source apparatus can be used to reduce power consumption and to reduce the re-illumination time.

The invention claimed is:

1. A light source apparatus comprising:
   a plurality of light sources arranged around a circumference;
   an optical unit for receiving illumination light emitted from one of the light sources disposed at a corresponding position by relatively rotating around a center axis about which the light sources are arranged;
   a motor for relatively rotating the optical unit or the plurality of light sources in accordance with a motor control process mode;
   a mode-setting unit for setting the motor control process mode in a first mode or a second mode;
   a motor controlling unit for controlling the rotational speed of the motor according to the first mode or the second mode; and
   a light-source controlling unit for controlling the illumination state of the light sources according to the first mode or the second mode,
   wherein, when the light sources are to be illuminated, the first mode is set, and when the light sources are to be extinguished, the second mode is set.

2. The light source apparatus according to claim 1, wherein, in the second mode, the motor controlling unit controls the rotational speed of the motor to a rotational speed lower than the rotational speed of the motor in the first mode.

3. The light source apparatus according to claim 2, wherein, in the second mode, the motor controlling unit controls the rotational speed of the motor so that the rotational speed is reduced with time.

4. The light source apparatus according to claim 1, wherein, in the second mode, the motor controlling unit carries out control to stop the motor after rotating the motor at a rotational speed lower than the rotational speed in the first mode for a predetermined amount of time.

5. The light source apparatus according to claim 1, wherein, in the second mode, the motor controlling unit carries out control to stop the motor after rotating the motor at the same rotational speed as the rotational speed in the first mode for a predetermined amount of time.

6. The light source apparatus according to claim 1, wherein, in the second mode, the motor controlling unit carries out control to rotate the motor at a rotational speed lower than the rotational speed in the first mode after rotating the motor at the same rotational speed as the rotational speed in the first mode for a predetermined amount of time.

7. The light source apparatus according to claim 1, wherein, when the mode setting unit detects the presence of an input signal and detects a state in which an input signal is present after a state in which an input signal is not present, the mode is changed from the second mode to the first mode.

8. The light source apparatus according to claim 1,
   wherein the mode setting unit includes a lookup table storing information related to the first mode and the second mode, and
   wherein the first mode or the second mode is set on the basis of detection information and a mode-changing condition input to the lookup table.

9. The light source apparatus according to claim 8, further comprising:
   a storage unit for storing a plurality of lookup tables of different types; and
   a selecting unit for selecting one lookup table from the storage unit according to the level of power saving required by the light source apparatus,
   wherein control is carried out in accordance with the selected lookup table.

10. A light source apparatus comprising:

a plurality of light sources arranged around a circumference;

an optical unit receiving illumination light emitted from one of the light sources disposed at a corresponding position by relatively rotating around a center axis about which the light sources are arranged;

a motor relatively rotating at least one of the optical unit and the plurality of light sources in accordance with a motor control process mode, the motor control process mode having a first mode and a second mode;

a motor controlling unit controlling the rotational speed of the motor according to the first mode or the second mode; and a light-source controlling unit controlling the illumination state of the light sources according to the first mode or the second mode, wherein, the light sources are illuminated when the motor control process mode is in the first mode, and the light sources are extinguished when the motor control process mode is in the second mode.

* * * * *